(12) United States Patent
Carlen (10) Patent No.: US 9,575,635 B2
(45) Date of Patent: Feb. 21, 2017

(54) RETURN TO SENDER

(71) Applicant: Apple Inc., Cupertino, CA (US)

(72) Inventor: Conrad Rhodes Carlen, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 13/795,809

(22) Filed: Mar. 12, 2013

(65) Prior Publication Data

US 2014/0195928 A1    Jul. 10, 2014

Related U.S. Application Data

(60) Provisional application No. 61/749,136, filed on Jan. 4, 2013.

(51) Int. Cl.
| | | |
|---|---|---|
| G06F 3/01 | (2006.01) | |
| G06F 3/0484 | (2013.01) | |
| G06Q 10/10 | (2012.01) | |
| H04L 12/58 | (2006.01) | |
| G06F 3/00 | (2006.01) | |

(52) U.S. Cl.
CPC .......... *G06F 3/0484* (2013.01); *G06Q 10/107* (2013.01); *H04L 51/08* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2002/0099777 A1* | 7/2002 | Gupta et al. | 709/206 |
| 2003/0014493 A1* | 1/2003 | Sakurai | G06F 19/327 709/206 |
| 2004/0158607 A1* | 8/2004 | Coppinger et al. | 709/206 |
| 2005/0219151 A1 | 10/2005 | Li et al. | |
| 2006/0075046 A1* | 4/2006 | Yozell-Epstein et al. | 709/206 |
| 2006/0075049 A1* | 4/2006 | Matsubara | G06Q 10/107 709/206 |
| 2008/0098078 A1* | 4/2008 | Daniell | 709/206 |
| 2008/0162651 A1* | 7/2008 | Madnani | 709/206 |
| 2008/0270543 A1* | 10/2008 | Bhamidipaty et al. | 709/206 |
| 2009/0030933 A1* | 1/2009 | Brezina | H04M 15/00 |
| 2009/0106367 A1* | 4/2009 | Banerjee | G06Q 10/107 709/206 |
| 2009/0228565 A1* | 9/2009 | Kalyan et al. | 709/206 |
| 2011/0087744 A1* | 4/2011 | Deluca et al. | 709/206 |
| 2012/0136952 A1* | 5/2012 | Mulder | G06F 17/241 709/206 |
| 2012/0284639 A1* | 11/2012 | Yuniardi et al. | 715/752 |
| 2013/0024780 A1* | 1/2013 | Sutedja et al. | 715/752 |
| 2013/0080548 A1* | 3/2013 | Krajec | 709/206 |
| 2014/0122883 A1* | 5/2014 | LeVasseur et al. | 713/170 |

* cited by examiner

*Primary Examiner* — Toan Vu
(74) *Attorney, Agent, or Firm* — Fish & Richardson P.C.

(57) ABSTRACT

In some implementations, a return to sender option can be invoked from within a file editing application when a user has edited a file received as a message attachment. The user can select a file attached to a message from within a messaging application. A file editor can be invoked to open and edit the file. The user can select a return to sender option from within the file editor. In response to the selection of the return to sender option, the edited file can be automatically saved, a reply message can be automatically generated and the edited file can be automatically attached to the reply message.

19 Claims, 8 Drawing Sheets

RETURN TO SENDER

CROSS REFERENCE TO RELATED APPLICATIONS

This application is a non-provisional of and claims priority to U.S. Provisional Patent Application No. 61/749,136, filed on Jan. 4, 2013, the entire contents of which are hereby incorporated by reference.

TECHNICAL FIELD

The disclosure generally relates to electronic messaging and file editing.

BACKGROUND

Electronic messaging applications (e.g., email, instant messaging, text messaging applications, etc.) on computing devices often allow a user to receive files as attachments to messages from users of other devices. Sometimes the receiving user needs to edit and return a file attachment to the sending user. The process of opening, editing, saving, and attaching the file attachment to a reply message can be a tedious and time consuming process.

SUMMARY

In some implementations, a return to sender option can be invoked from within a file editing application when a user has edited a file received as a message attachment. The user can select a file attached to a message from within a messaging application. A file editor can be invoked to open and edit the file. The user can select a return to sender option from within the file editor. In response to the selection of the return to sender option, the edited file can be automatically saved, a reply message can be automatically generated and the edited file can be automatically attached to the reply message.

Particular implementations provide at least the following advantages: The receiving user can quickly and easily return an edited version of a file attachment to the sender of the file attachment. The receiving user is not required to navigate a file system to return the edited file to the sending user. The process of saving an edited file, generating a reply message and attaching the edited file to the reply message is performed in response to a single user input thereby simplifying the process for the user and improving the user experience.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 1:
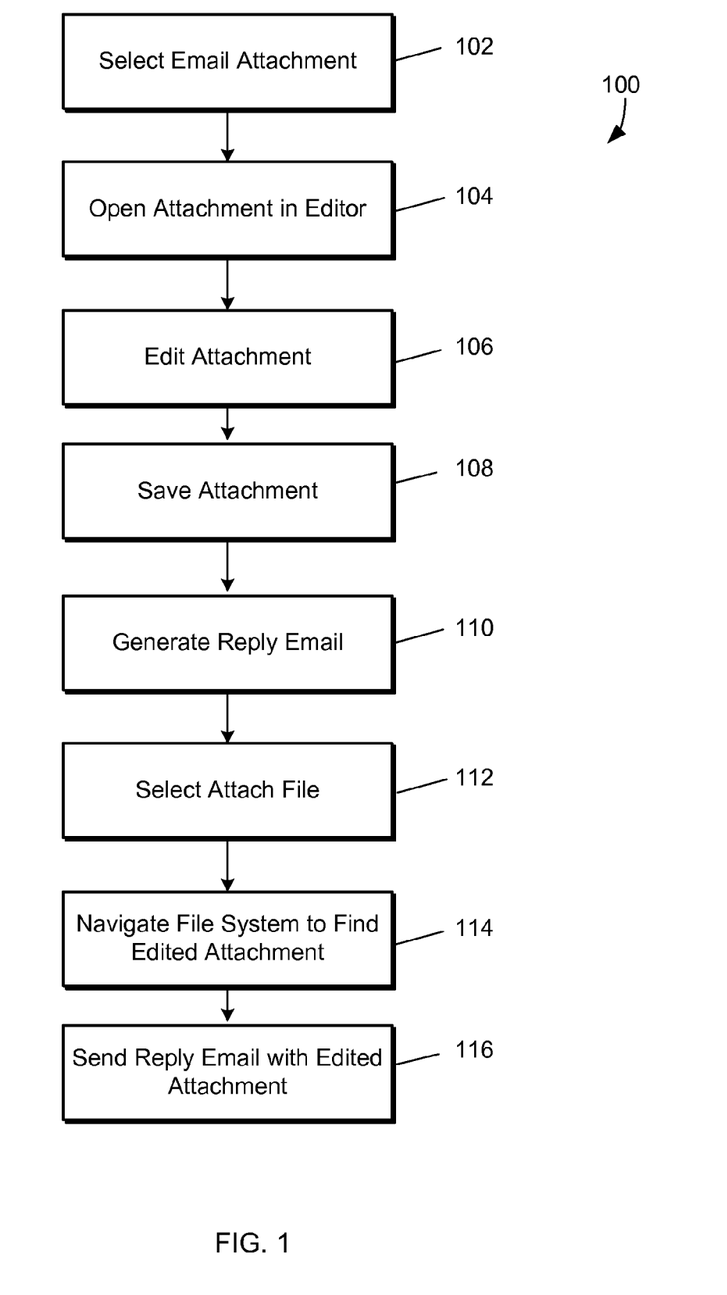
FIG. 1 illustrates an example process performed by a receiving user for returning an edited file attachment to a sending user.

FIG. 1 illustrates an example process 100 performed by a receiving user for returning an edited file attachment to a sending user according to previously known practices. As used herein, a file attachment is a file received as an attachment to a message. An edited file attachment is a file attachment that has been edited. For example, a receiving user can receive an email at a computing device from a sending user containing a file attachment. The sending user can request that the receiving user edit the file attachment (e.g., sign a letter, review and comment on a draft file, etc.) and return the edited file attachment to the sending user. The typical lengthy and tedious process for opening, editing and returning the edited file attachment is as follows.

At step 102, the user can select the email attachment. For example, the receiving user can open an email application on the computing device to view an email received from the sending user. The email can include a file attachment that the receiving user wishes to edit and return to the sending user. The receiving user can select the file attachment in order to view the file attachment.

At step 104, the selected file attachment can be opened in a file editor. For example, the user can select an option or perform an input to the email application to open the selected file attachment in a file editing application of the computing device. A file editor (e.g., text editing application, image editing application, presentation editing application, etc.) can be invoked to display and edit the file attachment. When the file editor is invoked for the selected file attachment, the contents of the file attachment can be displayed in the file editor application. Sometimes a copy of the file attachment can be displayed in the file editor application for editing.

At step 106, the receiving user can edit the file attachment displayed in the file editing application. For example, the user can add and/or remove text, images, audio, video or other content to and/or from the file attachment or copy thereof.

At step 108, the receiving user can provide input to save the edited file attachment. For example, the user can select a menu item or graphical object to save the edited file attachment. The user can be prompted to select a file system location where the edited file attachment should be saved. The edited file attachment can then be saved (e.g., stored) in the file system of the computing device.

At step 110, the user can provide input to generate a reply email. For example, the receiving user can interact or provide input to the email application to generate a reply email to the email sent by the sending user.

At step 112, the user can select to attach a file to the reply email. For example, the user can select an option in the email application to attach a file to the reply email.

At step 114, the user can navigate the files system of the computing device to locate the edited file attachment. For example, when the attach file option is selected in the email application, the email application can present a window that allows the user to browse the file system of the computing device to locate the edited file attachment. Once the edited file attachment is located, often after traversing several directories of the file system, the receiving user can select and attach the edited file attachment to the reply email.

At step 116, the user can send the reply email with the edited file attachment. For example, the user can select a menu item or other graphical object to cause the email application to transmit the reply email with edited file attachment back to the sending user.

As readily understood from reviewing the steps of process 100, the receiving user must perform many steps that waste time and require much effort in order for the receiving user to return an edited file attachment to the sending user. The return to sender processes described herein are designed to simplify and reduce the receiving user interactions necessary for returning an edited file attachment to the sending user, as illustrated by FIG. 2.

Figure 2:
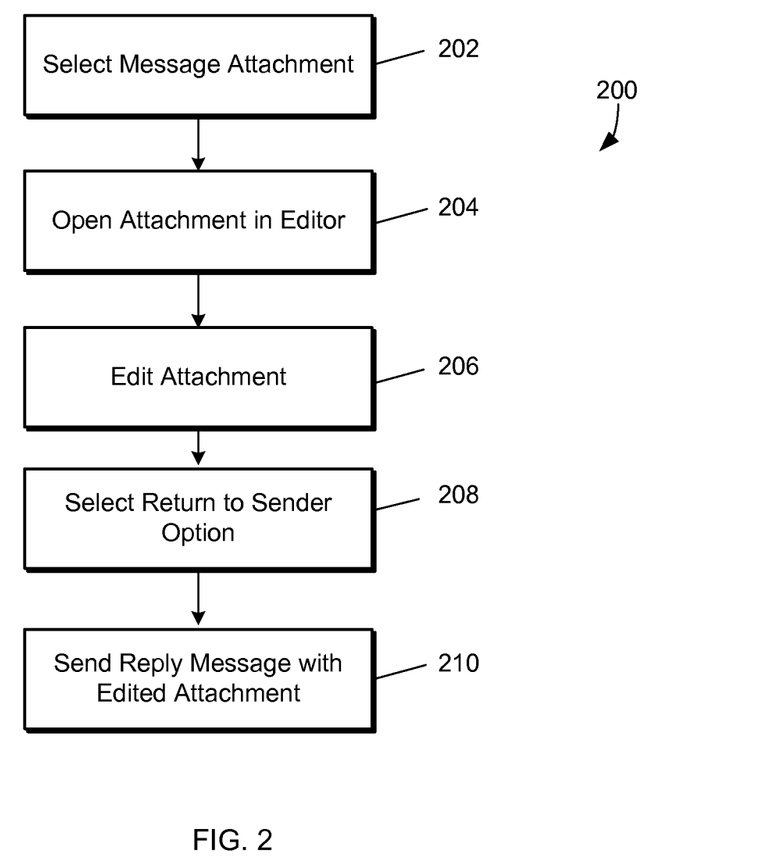
FIG. 2 illustrates an example process performed by a receiving user for returning an edited file attachment to the sending user using the return to sender functions described herein.

FIG. 2 illustrates an example process 200 performed by a receiving user for returning an edited file attachment to the sending user according to implementations described herein. For example, process 200 demonstrates the reduced number of user interactions and/or inputs required for returning an edited file attachment to a sender of the attachment according to implementations described herein. Like process 100 above, process 200 begins after a receiving user has received a message (e.g., email, text message, instant message, etc.) having a file attachment at a computing device. The received message and attachment can be presented in a user interface of a messaging application (e.g., email application, text messaging application, SMS application, instant messaging application, etc.).

At step 202, the receiving user can select the file attached to the message. For example, the receiving user can select a file attached to an email, text message, instant message or other electronic message.

At step 204, the user can open the file attachment in a file editor. For example, if the message is an email message, the receiving user can select a menu item, select a graphical object or provide input to open the selected file attachment in a file editor. In response to the user input, the file can be displayed in a user interface of the file editor.

At step 206, the user can edit the file attachment. For example, the receiving user can add and/or remove text, images, video, sound or other content to and/or from the file attachment using features of the file editor.

At step 208, the user can select a 'return to sender' option within the file editor. For example, the receiving user can select a menu item, a graphical object or provide other user input to indicate that the receiving user would like to return the edited file attachment to the sending user. In response to the selection of the 'return to sender' option, a reply to the message received from the sending user can be generated and the edited file attachment can be attached to the message without requiring the user to take steps or provide input to save the edited file attachment, generate the reply message and browse the computing device's file system to find and select the file.

At step 210, once the reply message is generated and the edited file attachment attached to the reply message in response to the user's selection of the 'return to sender' option, the user can provide input to send the reply message back to the sending user. For example, the user can select a menu item, graphical object or provide other input to direct the messaging application to transmit the message with attachment to the sending user.

Figure 3:
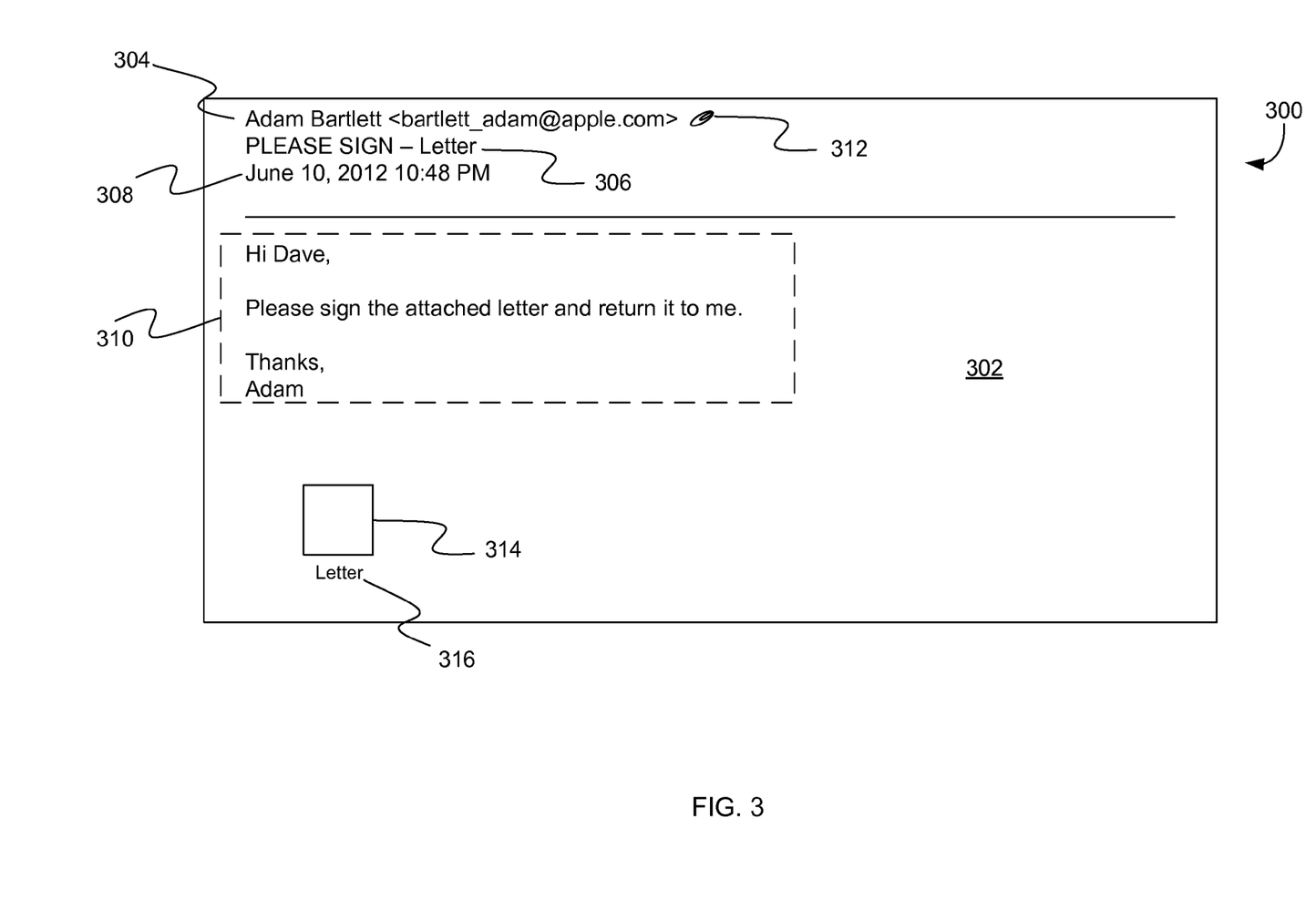
FIG. 3 illustrates an example messaging graphical user interface.

FIG. 3 illustrates an example messaging graphical user interface 300. For example, messaging GUI 300 can represent an email GUI, an instant messaging GUI, a text messaging GUI or any other GUI for presenting electronic messages and attachments thereto. However, GUI 300 will sometimes be referred to as a GUI of an email application in the description that follows. GUI 300 can present to a receiving user a message 302 which was received from a sending user.

In some implementations, GUI 300 can present an identifier 304 associated with the user who sent message 302. For example, if the message is an email message, the identifier can be an email address associated with the sending user. If the message is an instant message or a chat message, the identifier can be a handle (e.g., online name, user name, etc.) associated with the sending user. If the message is a text message (e.g., SMS message), the identifier can be a telephone number associated with the sending user.

In some implementations, GUI 300 can present text 306 describing the subject of message 302. In some implementations, GUI 300 can present text 308 indicating the date and/or time that message 302 was received. In some implementations, GUI 300 can present text 310 comprising the body of message 302.

In some implementations, GUI 300 can present graphical object 312 indicating that message 302 has an attached file. In some implementations, GUI 300 can present a graphical object 314 (e.g., an icon, image, etc.) representing the file attached to message 302. For example, the attached file can be a video file, an audio file, a text file, an image file, or a combination thereof. Graphical object 314 can have an appearance that represents the type of file attached to message 302. Thus, the appearance of graphical object 314 can change according to the type of file attached to message 302. In some implementations, GUI 300 can present text 316 associated with the attached file. For example, text 316 can be a name or identifier associated with the attached file. In some implementations, the user can select graphical object 314 and provide input (e.g., a menu item selection, graphical object selection, double click, sustained touch, etc.) to cause the attached file to be opened and displayed in a file editor.

Figure 4:
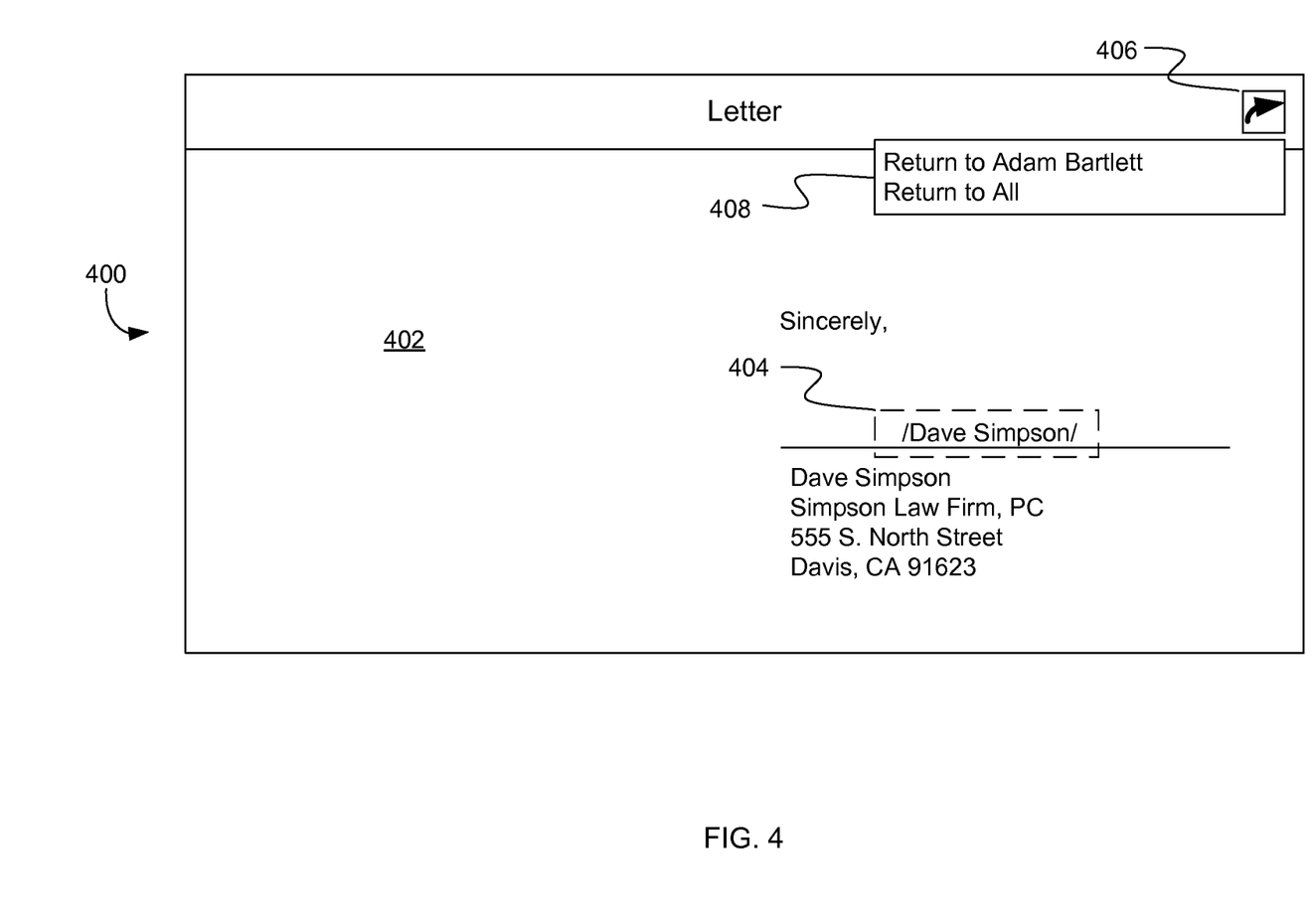
FIG. 4 illustrates an example file editor graphical user interface having a 'return to sender' feature.

FIG. 4 illustrates an example file editor graphical user interface 400 having a 'return to sender' feature. For example, GUI 400 can be a user interface of a video editing application, a text editing application, a music editing application, an image editing application or any other type of application that can be used to edit a file or file. However, GUI 400 will sometimes be described as a text editing application interface in the description that follows.

In some implementations, GUI 400 can display the contents of the selected file attachment to message 302. For example, if the file attached to message 302 is a letter, then GUI 400 can display the contents of letter 402. In some implementations, the user can edit the contents of the file attachment within GUI 400. For example, if the sending user has requested that the sending user sign the letter attached to message 302, the receiving user can edit the contents of letter 402 by inserting text 404 corresponding to the receiving user's signature.

In some implementations, the receiving user can select an option provided by GUI 400 to return the edited file attachment to the sending user. For example, the user can select graphical object 406 to display a menu 408 for returning the edited version of the file attachment to the sending user. Menu 408 can provide an option for returning the edited file attachment to only the sending user (e.g., Return to Adam Bartlett). In some implementations, the return to sender menu option (e.g., Return to Adam Bartlett) can be dynamically changed to indicate the sending user (e.g., the user who sent the file attachment to the receiving user). Menu 408 can provide an option (e.g., Return to All) for returning the file to all addressees associated with the received message 302. For example, in a multiple messaging system (e.g., group text messaging) or an email system all addressees associated with message 302 will receive the edited file attachment if the return to all option is selected from menu 408.

Figure 5:
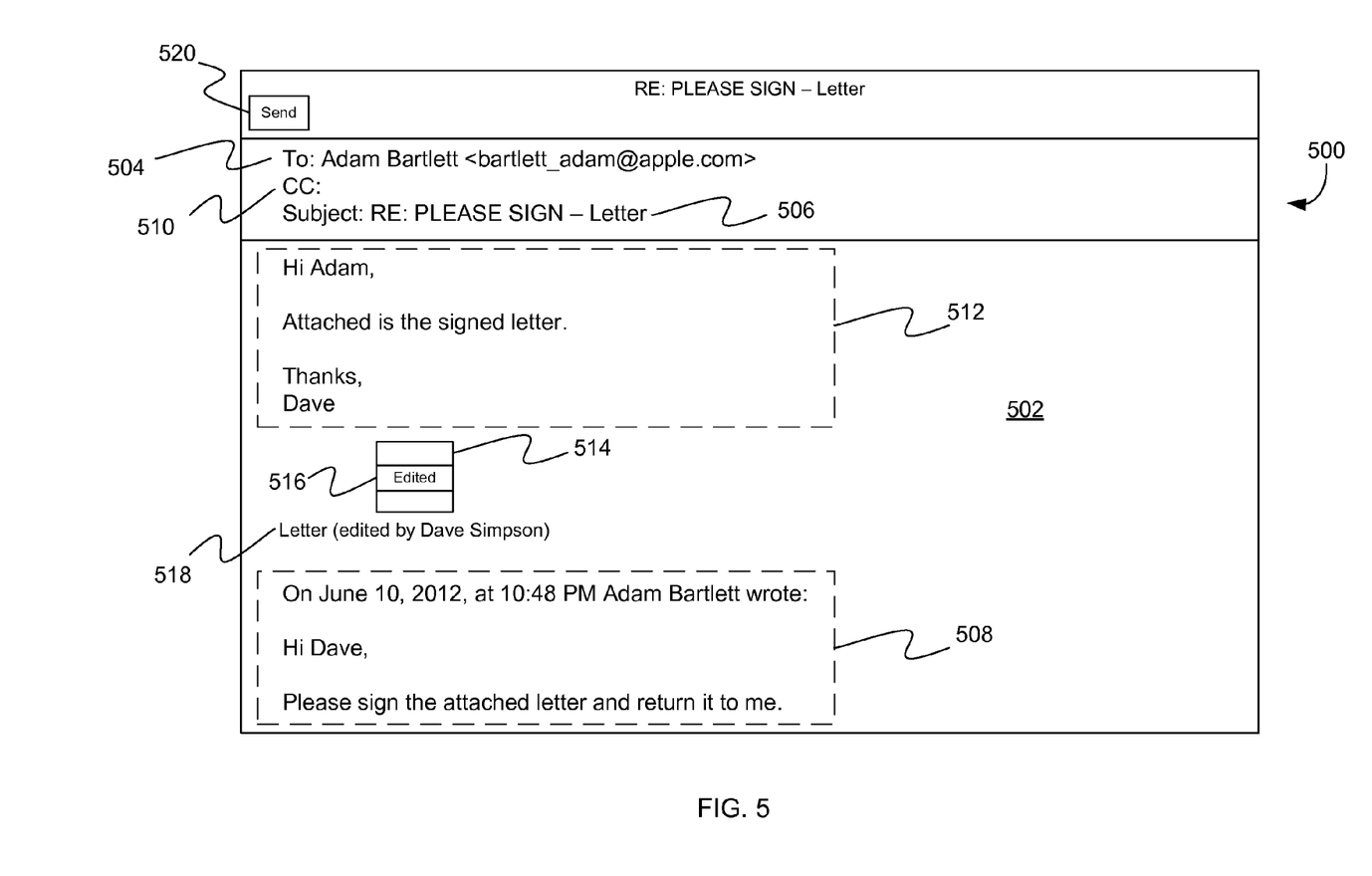
FIG. 5 illustrates an example messaging graphical user interface displaying a reply message generated in response to selection of the return to sender option.

In some implementations, in response to the user selecting the return to sender option or the return to all option from menu 408, a reply to message 302 will be automatically generated and the edited file attachment will be automatically attached to the reply, as illustrated by FIG. 5 and described in further detail below.

FIG. 5 illustrates an example messaging graphical user interface 500 displaying an reply message generated in response to selection of the return to sender option or the return to all option described above with reference to FIG. 4. For example, reply message 502 can be an email message, text message, instant message or any other type of electronic message.

In some implementations, reply message 502 can be automatically generated to include content from message 302. For example, reply message 502 can be automatically addressed 504 to the sender and/or other addressees of message 302 based on the selection of the reply to sender or reply to all option of GUI 400. The subject of reply message 502 can be automatically populated based on the subject of message 302, for example. The body of message 302 can be automatically inserted 508 into the body of reply message 502.

In some implementations, the file attachment edited in GUI 400 can be automatically attached to reply message 502. For example, the edited file attachment can be attached without requiring the user to navigate the file system of the computing device to find the edited file and attach the edited file to reply message 502.

In some implementations, GUI 500 can present a graphical object 514 (e.g., an icon, image, etc.) representing the edited file attachment. For example, graphical object 514 can be similar to graphical object 314 of FIG. 3 because the files are of the same type. However, graphical object 514 can differ from graphical object 314 in that graphical object 514 can present an appearance that indicates that the corresponding attached file is an edited version of the file attachment associated with graphical object 314. For example, graphical object 514 can include a graphic indicator 516 (e.g., banner, sash, etc.) indicating that the attached file has been edited.

In some implementations, GUI 500 can present text 518 associated with the edited file attachment. For example, text 518 can correspond to text 316 of FIG. 3. That is, text 518 can correspond to the name of the attached file. In some implementations, text 518 can indicate that the file attachment is an edited version of the previously received file attachment. For example, text 518 can include text indicating that the attached file was edited and/or who edited the attached file. For example, the name, identifier or email address of the user who edited the file can be added to the name of the attached file.

In some implementations, the receiving user can edit the reply message before returning the edited file attachment to the sending user. For example, the receiving user can add text to the body 512 of the reply message 502. The user can add additional addressees to the 'To:' and 'CC' fields 504 and 510. The user can change the subject field 506. The user can add addition attachments to the reply message 502. Once the receiving user is ready to return the edited file attachment to the sending user, the receiving user can select graphical object 520 to send reply message 502 to the sending user.

Figure 6:
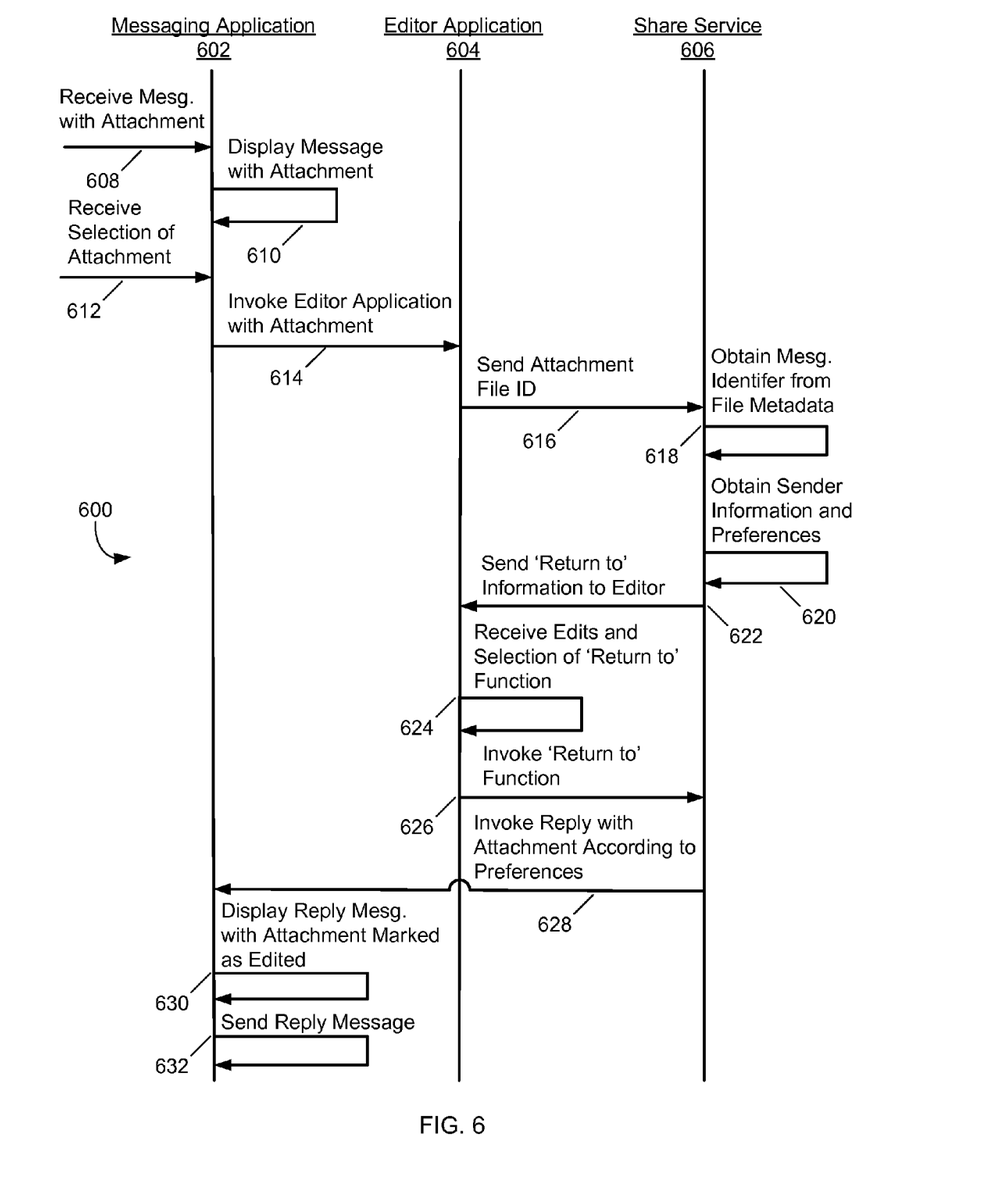
FIG. 6 illustrates an example graph of interactions between applications operating system services used to implement the return to sender mechanisms described herein.

FIG. 6 illustrates an example graph 600 of interactions between applications operating system services used to implement the return to sender mechanisms described above. Although graph 600 describes interactions, operations and functions performed by specific applications (e.g., messaging application 602, editor application 604) and components of a computer system (operating system share service 606), the interactions, operations and functions described can be performed by a different applications and/or operating system services than those described below. For example, a single application can include the messaging application operations, the editor application operations, and the share service operations described below. Alternatively, the messaging application and/or the editor application can perform the operations performed by the operating system share service.

At 608, messaging application 602 can receive a message with an attachment. For example, messaging application can be an email application, text messaging application, SMS application, instant messaging application or other electronic messaging application. In some implementations, when the attachment is received, the attachment can be associated with metadata that identifies the message with which the attachment is associated. In some implementations, the attachment metadata can include an identifier (e.g., an email address) associated with the user who sent the message and attachment. In some implementations, only an identifier associated with the last user to send the file will be included in the attachment metadata. In some implementations, the metadata can include preferences specified by the sending user. For example, when sending an attachment that the sending user wants the receiving user to edit and return, the sending user can specify a return file type other than the file type of the attachment. In some implementations, metadata associated with an attachment can be encrypted to prevent other users from accessing the metadata.

At 610, the received message can be displayed by messaging application 602. For example, the content of the received message can be displayed in a user interface of messaging application 602. In some implementations, a representation of the attachment can be displayed in a user interface of messaging application 602. An example GUI for messaging application 602 can be found in FIG. 3.

At 612, messaging application 602 can receive a selection of the attachment. For example, a user can select the message attachment, as described above with reference to FIG. 3

At 614, the messaging application can invoke editor application 604 with the attachment. For example, if the attachment is a text file, then editor application 604 can be a text editing application. If the attachment is an image file, then editor application 604 can be an image editing application. For example, by invoking editor application 604 with the attachment, the attachment (or identifier, file name, etc.) can be passed as a parameter to editor application 604 during initiation and the editor application can open and display the attachment upon display of a user interface of editor application 604.

At 616, upon initiation of editor application 604, editor application 604 can send information identifying the attachment to share service 606 (e.g., operating system service). For example, editor application 604 can include a share service client that configures graphical object 406 and menu 408. Upon initiation of editor application 604, the share service client can transmit to share service 606 a file identifier that identifies the attachment (e.g., file, file, etc.) opened in editor application 604.

At 618, share service 606 can obtain metadata associated with the file corresponding to the received file identifier. For example, share service 606 can obtain from the metadata a message identifier corresponding to the message in which the file (e.g., attachment) was received.

At 620, share service 606 can obtain sender information and preferences associated with the attached file. For example, the metadata associated with the file can include information identifying the sender (e.g., email address, user name, telephone number, etc.) of the attached file. Metadata associated with the file can include information indicating if there is more than one addressee associated with the file. The metadata associated with the file can include user preferences, such as a return file type. In some implementations, share service 606 can use the message identifier to query messaging application 602 for the user information and preferences.

At 622, share service 606 sends 'return to' information to editor application 604. For example, share service 606 can send information identifying the sender of the attached file. Share service 606 can send information indicating if there is more than one addressee associated with the file. Once editor application 604 (e.g., or the share service client within editor application 604) receives the sender information and addressee information, the editor application can configure graphical object 406 and menu 408 of FIG. 4 based on the sender information and addressee information. For example, if the file has no sender information and no addressee information, then the file was on received as an attachment and the 'return to sender' and 'return to all' options of menu 408 will not be displayed. If the sender is the only addressee associated with the file, then only the 'return to sender' (e.g., Return to Adam Bartlett) option will be displayed. If there are multiple addressees associated with the file, then both 'return to sender' and 'return to all' options will be displayed in menu 408 of FIG. 4.

In some implementations, the determination as to which 'return to' options to display in menu 408 of FIG. 4, as described above, is performed by share service 606. For example, the share service 606 can determine which options to enable and can provide the text and/or other configuration for menu 408 to editor application 604 for display upon selection of graphical object 406.

At 624, editor application 604 can receive edits, changes, modifications to the file from the user. Once the user is finished editing the file using the features and functions of editor application 604, as described with reference to FIG. 4 above, the user can select one of the 'return to' functions of menu 408 of FIG. 4. In some implementations, upon selection of a 'return to' function of menu 408, the edited file can be automatically saved in the file system of the computing device. In some implementations, the name of the user who edited the file and/or information indicating that the file has been edited can be added to the file metadata.

At 626, the editor application 604 can invoke a 'return to' function of share service 606. For example, editor application 604 can use an interface of the share service client within the editor application 604 to invoke a 'return to' function corresponding to the selected 'return to' option (e.g., return to sender, return to all) and provide to share service 606 an identifier associated with the edited file to be returned to the sender (or all addressees) associated with the file.

At 628, share service 606 can invoke a reply function of messaging application 602 to reply to the message received (608) from the sending user. For example, messaging application 602 can provide an application programming interface (e.g., a 'return to' API) for generating a reply message with an attachment. The 'return to' API can be parameterized to accept a message identifier, a file identifier, and a parameter indicating whether to reply to sender or reply to all addressees associated with the identified message. For example, the message identifier can be obtained from the file metadata, as described above. The file identifier can be received from editor application 604, as described above. Whether to 'reply to sender' or 'reply to all' can be determined by share service 606 based on which 'return to' function is invoked at 626.

In some implementations, share service 606 can perform operations to accommodate client preferences before invoking the reply function of messaging application 602. For example, if the file metadata includes information indicating that a return file type has been requested by the sending user, then share service 606 can convert the edited file to the requested file type before invoking the reply function at 628. If share service 608 converts the file (e.g., from .pages file format to .pdf file format), then share service 608 will send the file identifier for the converted file to messaging application 602. In some implementations, messaging application 602 can perform the file type conversion to conform to the sending user's requested file type.

At 630, messaging application 602 can generate and display a reply message based on the message identifier, file identifier and reply to parameters received at 628. For example, messaging application 602 can determine which message to reply to based on the received message identifier. Once the reply message is generated, messaging application 602 can attach the file identified by the received file identifier. Alternatively, if a file type conversion is required, then messaging application 602 can convert the file identified by the received file identifier into the requested file type and attach the converted file to the reply message. In some implementations, messaging application 602 can modify the name of the attached file to indicate that the file was edited, as described above with reference to FIG. 5. In some implementations, messaging application 602 can modify the graphical object representing the attached file to indicate that the file was edited, as described above with reference to FIG. 5. Once the reply message is generated and the edited file is attached to the reply message, the reply message and edited file attachment can be displayed on a user interface of messaging application 602.

At 632, messaging application 602 can send the reply message with edited attachment to the sending user. For example, once the receiving user is finished reviewing and editing the reply message displayed in the user interface of messaging application 602, the receiving user can select a send option of messaging application 602 to cause messaging application 602 to transmit the reply message with edited attachment to the sending user.

In some implementations, a 'forward to' function can be provided in a similar manner as the 'return to' functions described herein. For example, selection of a 'forward to' function can cause a message to be automatically generated based on a previously received message. Similar to the 'return to' functions described above, the subject and message body can be automatically populated based on an identified previous message. The edited attachment can be automatically attached to the forwarding message. However, with 'forward to', the addressee must be identified by the user; the addressee is not automatically identified like it is with the 'return to' functions described above.

Example Process

Figure 7:
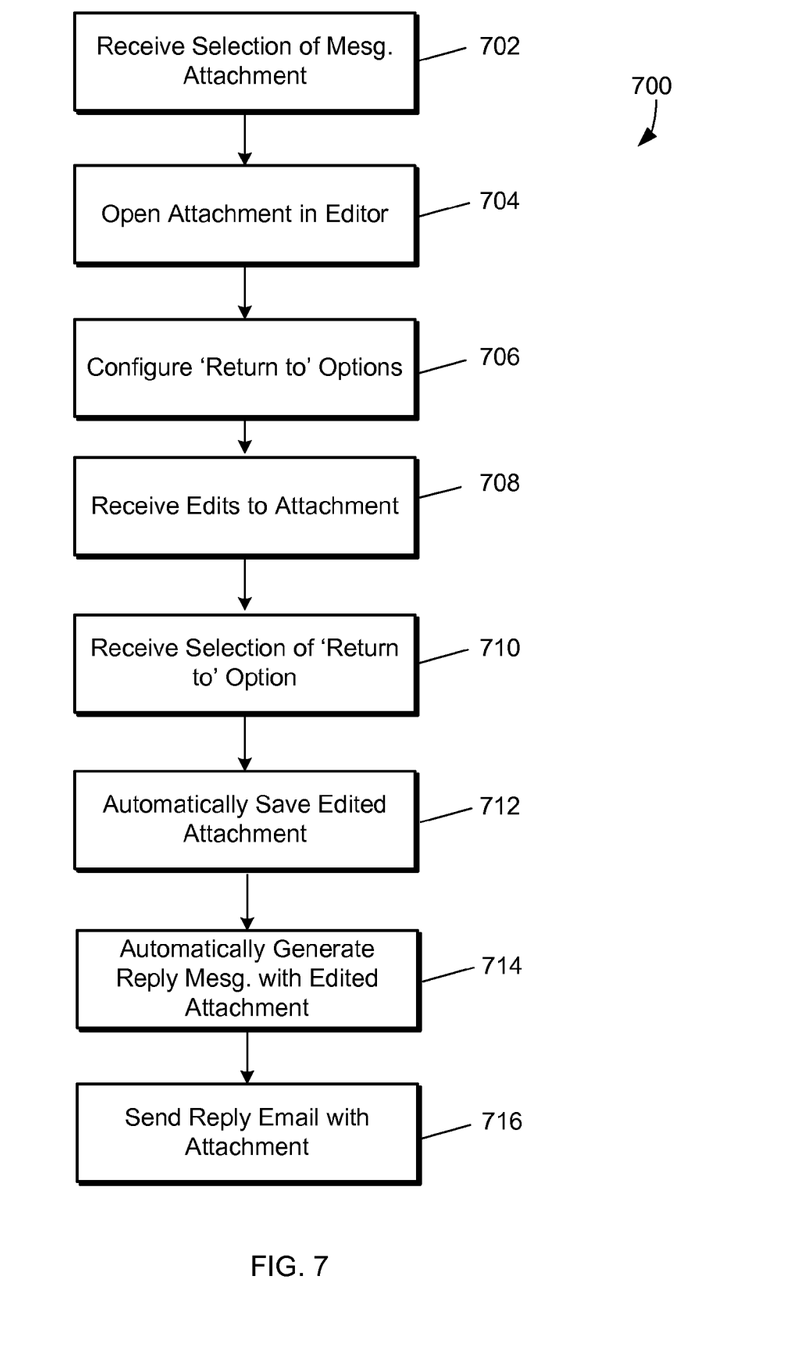
FIG. 7 is flow diagram of an example process for returning an edited message attachment to a sending user.

FIG. 7 is flow diagram of an example process 700 for returning an edited message attachment to a sending user. At step 702, selection of a message attachment can be received by a computing device. For example, a user can select an attachment to an email message displayed in an email application.

At step 704, the attachment can be opened in an editing application. For example, in response to receiving a selection of the attachment, the attachment can be opened in an editing application. If the attachment is a text file or file, then the attachment can be opened in a text editing application.

At step 706, the editing application can be configured with 'return to' options appropriate for the opened file. For example, if the file was not received as an attachment to a message, then no 'return to' options will be configured in the editing application. If the file was received as an attachment to a message, then 'return to sender' and/or 'return to all' options can be configured in the editing application as described above.

At step 708, edits to the attachment can be received by the computing device. For example, a user can provide input to the editing application to modify the contents of the attachment (e.g., file).

At step 710, a selection of a 'return to' option can be received by the computing device. For example, the editing application can receive user input indicating whether to return the edited attachment to only the sender of the attachment or to return the edited attachment to all addressees associated with the attachment.

At step 712, in response to receiving the selection of a 'return to' option, the computing device can automatically save the edited attachment.

At step 714, in response to receiving the selection of a 'return to' option, the computing device can automatically generate a reply to the message in which the attachment was received and automatically attach the edited attachment to the automatically generated reply message.

At step 716, the computing device can send the reply email with edited attachment to the sending user and/or addressees associated with the edited attachment.

Example System Architecture

Figure 8:
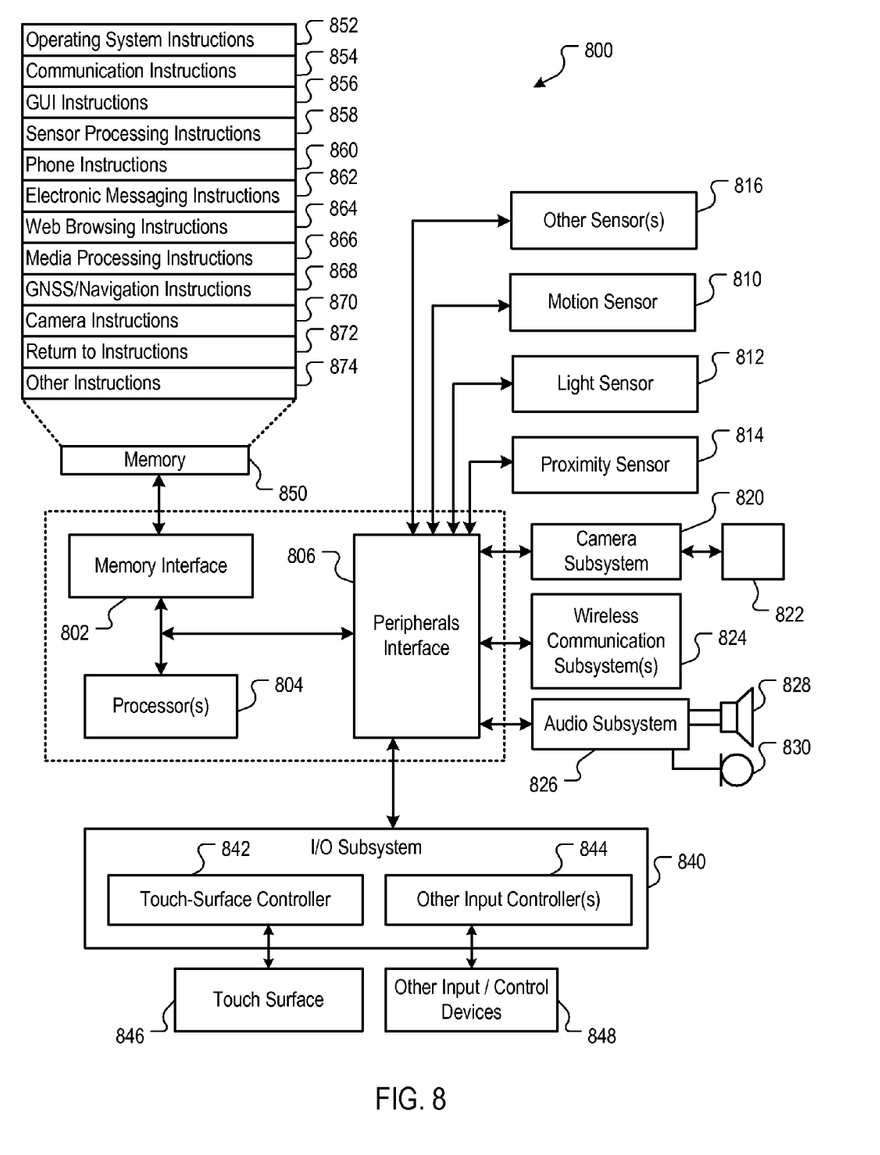
FIG. 8 is a block diagram of an example system architecture that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™. The computing device 800 can, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing the return to sender features described above. For example, operating system 852 can implement the return to sender features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store other software instructions 872 to facilitate other processes and functions, such as the return to sender processes and functions as described with reference to FIGS. 1-7. For example, software instructions 872 can include instructions to facilitate the messaging application and/or editor application processes and functions described above with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method comprising:
   presenting, on a display of a computing device, contents of a file in a user interface of a file editing application, where the file was received as an attachment to an electronic message;
   examining metadata of the file that is received as the attachment to the electronic message, wherein the metadata includes information about the electronic message;
   based on examining the metadata corresponding to the file, identifying a sender of the electronic message from the information included in the metadata;
   receiving an input to the user interface of the file editing application for returning the file to a sender of the electronic message; and
   in response to the input, from metadata automatically generating a reply message directed towards the sender of the electronic message, wherein the sender is identified by examining the information included in the metadata of the file that is received as the attachment;
   automatically attaching the file to the reply message, wherein automatically attaching the file to the reply message includes presenting indicia in the reply message indicating that the attached file is an edited version of the file received as an attachment to the electronic message; and
   presenting the reply message on a user interface of an electronic messaging application.

2. The method of claim 1, further comprising:
   displaying the electronic message from the sender, the electronic message having the file attached;
   receiving a selection of the file; and
   presenting the contents of the file in the file editing application user interface.

3. The method of claim 1, wherein automatically generating the reply message comprises automatically including content from the electronic message in the reply message.

4. The method of claim 1, wherein the metadata corresponding to the file that is received as the attachment includes preferences specified by the sender of the electronic message.

5. The method of claim 1, wherein automatically generating a reply message to the electronic message comprises:

receiving, at an operating system service from the file editing application, a message identifier that identifies the electronic message and a file identifier that identifies the file;

transmitting, from the operating system service to the electronic messaging application, the message identifier and the file identifier; and wherein the electronic messaging application automatically generates the reply message in response to receiving the message identifier and the file identifier.

6. The method of claim 1, wherein presenting the contents of the file in the user interface of the file editing application comprises presenting a control option on the user interface for returning the file to a sender of the electronic message, the control option including information identifying the sender of the electronic message, and wherein receiving the input to the user interface of the file editing application for returning the file to the sender of the electronic message comprises receiving an input selecting the control option.

7. The method of claim 1, further comprising:

in response to the input, automatically saving the file.

8. A non-transitory computer-readable medium including one or more sequences of instructions which, when executed by one or more processors, cause the one or more processors to perform operations comprising:

presenting, on a display of a computing device, contents of a file in a user interface of a file editing application, where the file was received as an attachment to an electronic message;

examining metadata of the file that is received as the attachment to the electronic message, wherein the metadata includes information about the electronic message;

based on examining the metadata corresponding to the file, identifying a sender of the electronic message from the information included in the metadata;

receiving an input to the user interface of the file editing application for returning the file to a sender of the electronic message; and in response to the input, from metadata automatically generating a reply message directed towards the sender of the electronic message, wherein the sender is identified by examining the information included in the metadata of the file that is received as the attachment;

automatically attaching the file to the reply message, wherein automatically attaching the file to the reply message includes presenting indicia in the reply message indicating that the attached file is an edited version of the file received as an attachment to the electronic message; and presenting the reply message on a user interface of an electronic messaging application.

9. The non-transitory computer-readable medium of claim 8, wherein the instructions cause the one or more processors to perform operations comprising:

displaying the electronic message from the sender, the electronic message having the file attached;

receiving a selection of the file; and presenting the contents of the file in the file editing application user interface.

10. The non-transitory computer-readable medium of claim 8, wherein the instructions that cause automatically generating the reply message comprise instructions that cause automatically including content from the electronic message in the reply message.

11. The non-transitory computer-readable medium of claim 8, wherein the metadata corresponding to the file that is received as the attachment includes preferences specified by the sender of the electronic message.

12. The non-transitory computer-readable medium of claim 8, wherein the instructions that cause automatically generating a reply message to the electronic message comprise instructions that cause the one or more processors to perform operations comprising:

receiving, at an operating system service from the file editing application, a message identifier that identifies the electronic message and a file identifier that identifies the file;

transmitting, from the operating system service to the electronic messaging application, the message identifier and the file identifier; and wherein the electronic messaging application automatically generates the reply message in response to receiving the message identifier and the file identifier.

13. The non-transitory computer-readable medium of claim 8, further comprising:

in response to the input, automatically saving the file.

14. A system comprising:

one or more processors; and a computer-readable medium including one or more sequences of instructions which, when executed by the one or more processors, causes the one or more processors to perform operations comprising:

presenting, on a display of a computing device, contents of a file in a user interface of a file editing application, where the file was received as an attachment to an electronic message;

examining metadata of the file that is received as the attachment to the electronic message, wherein the metadata includes information about the electronic message;

based on examining the metadata corresponding to the file, identifying a sender of the electronic message from the information included in the metadata;

receiving an input to the user interface of the file editing application for returning the file to a sender of the electronic message; and in response to the input, from metadata automatically generating a reply message directed towards the sender of the electronic message, wherein the sender is identified by examining the information included in the metadata of the file that is received as the attachment;

automatically attaching the file to the reply message, wherein automatically attaching the file to the reply message includes presenting indicia in the reply message indicating that the attached file is an edited version of the file received as an attachment to the electronic message; and presenting the reply message on a user interface of an electronic messaging application.

15. The system of claim 14, wherein the instructions cause the one or more processors to perform operations comprising:

displaying the electronic message from the sender, the electronic message having the file attached;

receiving a selection of the file; and presenting the contents of the file in the file editing application user interface.

16. The system of claim 14, wherein the instructions that cause automatically generating the reply message comprise instructions that cause automatically including content from the electronic message in the reply message.

17. The system of claim 14, wherein the metadata corresponding to the file that is received as the attachment includes preferences specified by the sender of the electronic message.

18. The system of claim 14, wherein the instructions that cause automatically generating a reply message to the electronic message comprise instructions that cause the one or more processors to perform operations comprising:
- receiving, at an operating system service from the file editing application, a message identifier that identifies the electronic message and a file identifier that identifies the file;
- transmitting, from the operating system service to the electronic messaging application, the message identifier and the file identifier; and
- wherein the electronic messaging application automatically generates the reply message in response to receiving the message identifier and the file identifier.

19. The system of claim 14, further comprising:
in response to the input, automatically saving the file.

\* \* \* \* \*